United States Patent [19]

Atkinson et al.

[11] Patent Number: 4,898,701

[45] Date of Patent: Feb. 6, 1990

[54] MANUFACTURE OF SHAPED ARTICLES FROM REFRACTORY POWDER

[75] Inventors: Alan W. Atkinson; David N. Smith, both of Rugby, United Kingdom

[73] Assignee: T&N Materials Research Limited, Manchester, England

[21] Appl. No.: 139,762

[22] Filed: Dec. 30, 1987

[30] Foreign Application Priority Data

Jan. 23, 1987 [GB] United Kingdom ............ 8701538

[51] Int. Cl.$^4$ .............................................. C08B 33/13
[52] U.S. Cl. ................................ 264/109; 264/175; 264/234
[58] Field of Search ................ 264/63, 109, 175, 234

[56] References Cited

U.S. PATENT DOCUMENTS

| | | | |
|---|---|---|---|
| 3,316,110 | 4/1967 | Herbst | 264/63 |
| 3,352,814 | 11/1967 | Collins et al. | 264/234 |
| 4,379,108 | 4/1983 | Robertson | 264/63 |

FOREIGN PATENT DOCUMENTS 60-251167  12/1985  Japan ............................ 264/63

OTHER PUBLICATIONS

Cassidy, Phosphate Bonding Then and Now, Ceramic Bulletin, vol. 56, No. 7 (1977), pp. 640–643.
Fisher, Hot Strength of Phosphate Bonded Refractory Plastics, Ceramic Bulletin, vol. 56, No. 7, (1977), pp. 637–639.
O'Hara, Studies in Phosphate Bonding, Ceramic Bulletin, vol. 51, No. 7 (1972), pp. 590–595.
Gonzalez, Strength & Microstructure of Phosphate-Bonded Alumina Refractories.

*Primary Examiner*—James Derrington
*Attorney, Agent, or Firm*—Nixon & Vanderhye

[57] ABSTRACT

A method of making a shaped article comprises mixing a refractory powder with an aqueous acidic phosphate solution, subjecting the mixture thus formed to high shear to form a plastic mass, shaping the mass, and hardening the shaped mass at a temperature below the sintering temperature of the refractory powder. By this method articles of useful hot-strength can be obtained without having to employ the high temperatures required for sintering.

9 Claims, No Drawings

MANUFACTURE OF SHAPED ARTICLES FROM REFRACTORY POWDER

This invention relates to the manufacture of shaped articles from refractory powder.

Such articles can be made, without using the high temperatures required for sintering, by using as binder prior to the shaping operation an organic polymeric material, for example a partially hydrolysed polyvinylacetate at a level of about 10% by weight. Such a binder is, however, combustible above about 250° C., and when it burns the article is seriously weakened by its loss.

The present invention utilises an incombustible, inorganic binder, namely an aqueous acidic phosphate solution. Two well-known examples of such a solution are aqueous phosphoric acid and aqueous aluminium hydrogen phosphate solution, both of which have for many years been used as binders in the manufacture of unfired chemically bonded bricks from high-alumina aggregates, that is to say, high-alumina material whose particles are predominantly fairly coarse, typically 3 mm in largest dimension.

According to the invention, a method of making a shaped article comprises mixing a refractory powder with an aqueous acidic phosphate solution, subjecting the mixture thus formed to high shear to form a plastic mass, shaping the mass, and hardening the shaped mass at a temperature below the sintering temperature of the refractory powder.

The proportion of aqueous acidic phosphate solution required to form a suitable mixture is, perhaps owing to the viscous nature of these solutions, relatively small; and the mixture itself, which usually takes the form of a damp crumbly mass, undergoes a remarkable change in consistency on being subjected to high shear (as for example by means of a twin-roll mill), forming a cohesive plastic mass.

The refractory powder employed is suitably of particle size below 200 $\mu$m, and will usually form at least 50% by weight of the whole, ie of the shaped mass to be hardened.

If a roll mill is used for working the mixture, the plastic mass formed by high shear will ordinarily end up adhering to one only of the rolls, and can easily be parted therefrom. It can then be shaped, eg into dished or like container form, by conventional means such as pressing or extrusion. If a sheet-form product is desired, the plastic mass on the roll can be separated as a unitary mass, and then laid flat in a tray for hardening.

Depending on the precise nature of the ingredients present in the refractory powder, hardening may be possible at ambient temperature, for example 20° C., as in Example 1a later in this specification. Often, however, it will be desired to expedite hardening and/or improve strength, and this can be done by heating above 50° C., preferably above 200° C., as in Example 1b. It will sometimes be convenient to carry out at least the initial stage of hardening under pressure, in order to consolidate and prevent distortion of the mass.

The invention can be applied to the treatment of a wide variety of refractory powders for example alumina, titania, zirconia, zircon, and calcined clays.

Ordinary clays, such as the kaolinitic clays ball clay and china clay, may be included in the refractory powder to improve its plasticity under high shear, suitably in an amount up to 10% by weight of the whole, ie of the shaped mass to be hardened. To speed up hardening at ambient temperature, there may be included in the refractory powder magnesium oxide (up to about 15% by weight of the whole) or aluminium hydroxide (up to about 20%).

To improve the flexural strength and impact strength of the hardened product, inorganic fibres such as glass fibres, fibrous wollastonite or ceramic fibres may be included in the mixture; and impact strength can also be improved by inclusion of non-fibrous particles of a layer silicate such as mica or talc. Such additives for improving strength may form up to 25% by weight of the whole.

Organic fibres, such as fibres of polyacrylonitrile, polypropylene, or the kind of polyamide available under the registered trade mark KEVLAR, may be included to give impact strength at temperatures up to about 200° C., at a level no greater than about 2% by weight, so that the loss of hot strength if they are burnt out is not serious.

The following Examples further illustrate the invention and in particular show its application to the production of strong, refractory sheet material having good machinability and useful flexural strength at elevated temperatures (eg 850° C.), at the level encountered during the operation of electrical switchgear.

EXAMPLE 1

Calcined alumina powder (particle size 45 $\mu$m; surface area, 1 m$^2$/gram) was mixed in a Z-blade mixer with dead-burnt magnesia (91% MgO; particle size <0.2mm) and ball clay (particle size: 90% <5 $\mu$m; 60% <0.5 $\mu$m) and aluminium phosphate solution (40% aqueous Al(H$_2$PO$_4$)$_3$; pH 0.8) was added. Mixing was continued until a crumbly mass had formed. Its composition was:

|  | % by weight |
| --- | --- |
| Alumina | 75 |
| Magnesia | 1 |
| Ball clay | 7 |
| Al phosphate solution | 17 |
|  | 100% |

The crumbly mass was removed from the Z-blade mixer and charged to a twin-roll mill (roll diameter, 0.3 m; nip, 4 mm; speed, 10 rpm) and was repeatedly passed through the nip of the mill until it had become a cohesive plastic mass adhering to one of the two rolls. The mass was removed from the roll as a coherent sheet, of thickness about 4 mm, and the sheet was set aside to harden at ambient temperature.

After 3 days the sheet was cut into strips for testing.

(a) One batch was subjected to flexural strength tests 7 days after initial formation. Average flexurual strength was 38 MPa at room temperature. The strips showed negiligible creep at 500° C., good retention of strength at that temperature and useful flexural strength at 850° C.

(b) Two further batches were put into furnaces, at 400° C. and 600° C. respectively. After 4 hours they were removed, allowed to cool and tested for flexural strength at room temperature. Results were:

(i) '400° C.' sample: 40 MPa
(ii) '600° C.' sample: 51 MPa (c) Samples b(i) were immersed in water at 20° C. for 24 hours and then tested for flexural strength. On average, this was 28 MPa.

EXAMPLE 2

Following generally the procedure of Example 1, sheet material was prepared from the following ingredients in the following proportions by weight:

|  | % by weight |
| --- | --- |
| Calcined china clay | 38 |
| Alumina | 38 |
| Magnesia | 2 |
| Ball clay | 2 |
| Al phosphate solution | 20 |
|  | 100% |

The calcined china clay was that sold under the trade mark MOLOCHITE, calcined at 1350° C. and with particle size 98%<75 μm.

After hardening at room temperature for 7 days, flexural strength was 30 MPa. The product had excellent resistance to thermal stock, as assessed by a standard arc-resistance test.

EXAMPLES 3 to 5

Following generally the procedure of Example 1, products were prepared from the following ingredients in the following weight proportions, with hardening at room temperature, and were found to have the strengths shown.

|  | $Al_2O_3$ | Ball Clay | $Al(OH)_3$ | Phosphate Soln. | Glass fibre | Flexural Strength | Impact Strength |
| --- | --- | --- | --- | --- | --- | --- | --- |
| Example 3 | 56 | 7 | 17 | As Ex 1;20 | — | 41 MPa | 1.9 KJ/m² |
| Example 4 | 51 | 7 | 17 | As Ex 1;20 | 5 | 52 MPa | 5.2 KJ/m² |
| Example 5 | 59 | 7 | 17 | 60% $H_3PO_4$;17 | — | 49 MPa | — |

We claim:

1. A method of making phosphate-bonded refractory material in sheet form, comprising the steps of:
   (a) mixing a refractory powder of particle size below 200 μm with an aqueous acidic phosphate solution in a proportion such as to form a damp crumbly mass, said mass being free from combustible binder and containing a plasticity-improving clay in an amount up to about 10% by weight of the mass;
   (b) subjecting said crumbly mass to high shear by repeatedly passing it through the nip of a twin-roll mill until a cohesive plastic mass adhering to a roll of said mill is formed; and
   (c) removing said cohesive plastic mass from the roll as a coherent sheet and hardening said sheet at a temperature below the sintering temperature of the refractory powder and not greater than about 600° C.

2. A method according to claim 1, in which hardening is carried out entirely at ambient temperature.

3. A method according to claim 1, in which hardening is carried at a temperature in the range of 200° C. to 400° C.

4. A method according to claim 1, in which the plasticity-improving clay is ball clay or china clay.

5. A method according to claim 1, in which the refractory powder comprises alumina.

6. A method according to claim 1, in which the refractory powder comprises a calcined clay.

7. A method according to claim 1, in which the refractory powder also contains magnesium oxide or aluminum hydroxide.

8. A method according to claim 1, in which the aqueous acidic phosphate solution is a solution of aluminum phosphate.

9. A method according to claim 1, in which the phosphate solution is phosphoric acid.

* * * * *